3,354,120
POLYAMIDES PREPARED FROM
5,5'-DIAMINOINDIGO
Hartwig C. Bach, Durham, and Jack Preston, Raleigh, N.C., assignors to Monsanto Company, a corporation of Delaware
No Drawing. Filed Feb. 26, 1964, Ser. No. 347,355
12 Claims. (Cl. 260—47)

This invention relates to new high temperature resistant linear condensation polymers. More particularly, the invention relates to polymers with regularly recurring structural units containing amide linkages and fused bis-heterocyclic linkages.

Synthetic linear condensation polymers such as polyamides in the form of fibers, filaments, films and other shaped articles have found wide application in textile and other industrial end uses requiring high tensile strength, abrasion resistance, and resistance to thermal and other degradative conditions. Subsequent searching for polymers of improved thermal resistance has produced various heterocycle polymers such as polyoxadiazoles, polybenzimidazoles, and polyimides. Typical of such polymers are those in U.S. Patents 2,895,948, 2,904,537, and 3,044,994. Such heterocycle polymers have certain characteristics, including heat resistance and resistance to acids and other degradative conditions, which are superior to those of polyamides in general. Wholly aromatic polyamides such as those of U.S. 3,006,899 and 3,049,518 have also been found to be highly resistant to high temperatures. This invention presents polymers which combine the desirable qualities and characteristics of both aromatic polyamides and heterocycle polymers.

Accordingly, it is an object of this invention to provide new compositions of matter and a process for their preparation.

Another object of this invention is the provision of novel amide-heterocycle polymers which are characterized by the fact that they have amide linkages and at least one bis-heterocyclic linkage fused to certain aromatic radicals in each repeating unit, the linkages appearing in a perfectly regular sequence along the polymer chain, each amide and each fused bis-heterocyclic linkage being separated by an aromatic radical, the polymers further being characterized by the fact that there is at least one point of symmetry in each repeating unit of the polymer.

It is a further object to provide polymers which have unusually high thermal stability.

An additional object of the invention is the provision of fibers, filaments, films, and other shaped articles prepared from the amide-heterocycle polymers of this invention.

Other objects and advantages will become apparent from the description of the invention which follows hereinafter.

This invention is concerned with the provision and preparation of "symmetrical" amide-heterocycle polymers having the formula $$\left[-HN-Y'-NH-\overset{O}{\underset{\|}{C}}-Y-\overset{O}{\underset{\|}{C}}-\right]$$

wherein Y and Y' are selected from Ar and

Ar'—X—X—Ar' where Ar is an aromatic divalent radical containing up to 15 carbon atoms which may have a single, multiple or fused structure. Ar' is a trivalent aromatic radical which may have a single, multiple or fused structure, and X represents a heterocycle ring fused to Ar', X being a 5 or 6 ring member heterocyclic linkage which contains from one to two hetero elements such as N, S, P, As, O and Se. In the general formula Y and Y' may be the same or different provided that there is at least one Ar'—X—X—Ar' linkage in each repeating unit. In each Ar'—X—X—Ar linkage both Ar''s must have the same orientation with respect to the amide linkage. All occurrences of X in the repeating unit must be the same.

The fused bis-heterocyclic linkages are exemplified by

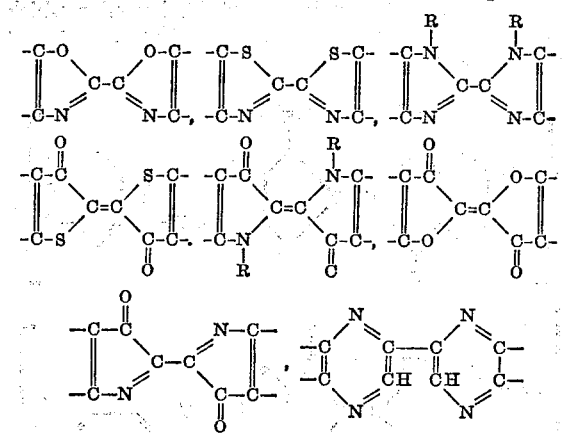

where R=H, lower alkyl, benzyl or phenyl. The divalent aromatic radicals Ar may be, for example,

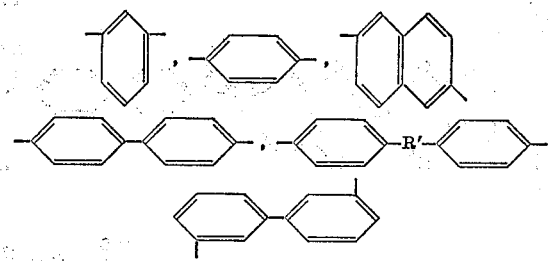

where R' is —O—, —S—, —SO$_2$— and similar aromatic radicals.

The aromatic radicals Ar' to which the bis-heterocyclic linkages are fused may be, for example,

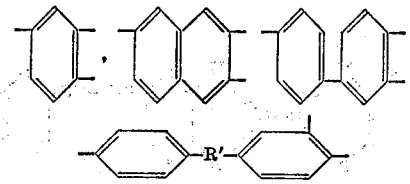

wherein R' is —O—, —S—, —SO$_2$— and similar aromatic radicals.

The use of the term "symmetrical" herein is intended to relate to a characteristic of the polymers of this invention which may be described by the fact that there is at least one point of symmetry in each repeating unit of the polymers. For example, repeating units may be shown as follows:

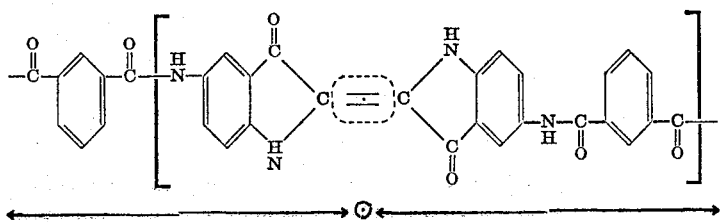

and

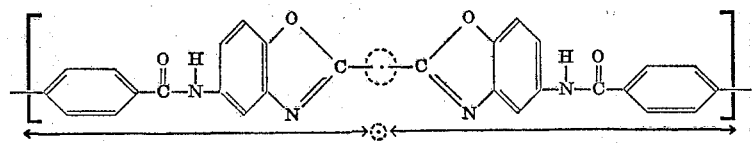

wherein a point of symmetry is indicated and wherein it is shown that the repeating units consist of corresponding portions all segments of which are equidistant from the point of symmetry.

As examples of the polymers of this invention which are embraced by the general formula as shown there may be mentioned:

(1)
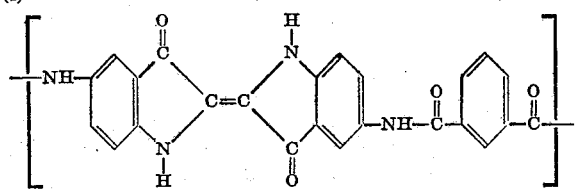

(2)
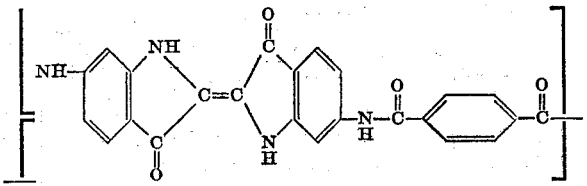

(3)
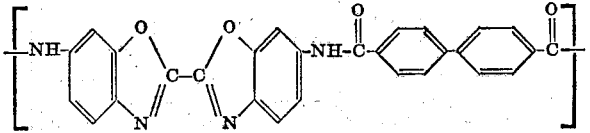

(4)
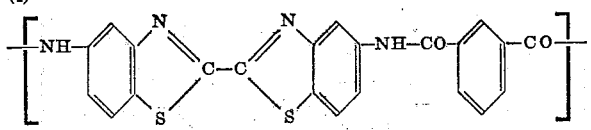

(5)
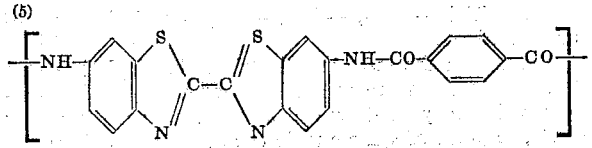

(6)
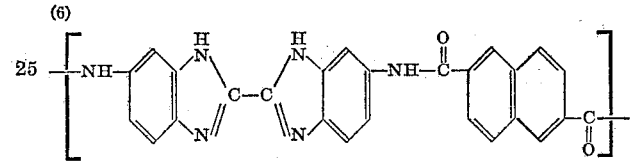

(7)
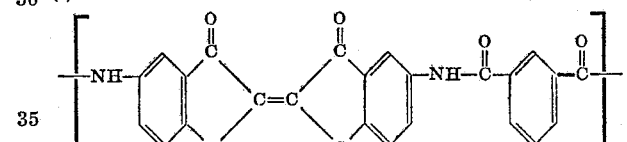

(8)
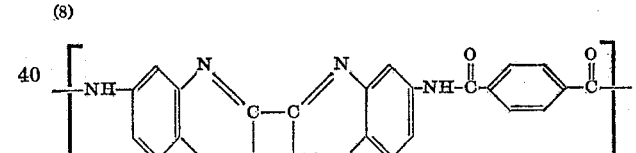

(9)
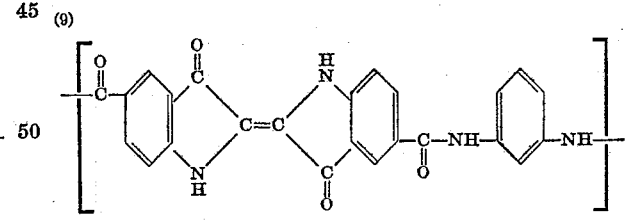

(10)
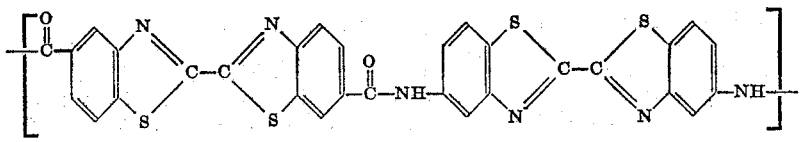

(11)
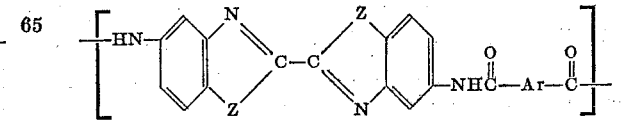

wherein Z is oxygen, sulfur or N–R where R is H, lower alkyl, benzyl or phenyl and Ar is an aromatic divalent radical containing up to 15 carbon atoms.

The polymers of this invention may be prepared by reacting together two monomers, each containing functional groups which react with the functional groups of the other to produce a polymer containing amide and two or more heterocyclic linkages in each repeating unit which appear in a perfectly regular sequence along the polymer chain. Thus, the polymers may be prepared via the reaction of an aromatic diacid chloride with an aromatic diamine containing a bis-heterocyclic linkage fused to aromatic radicals or from the reaction of an aromatic diacid chloride containing a bis-heterocyclic linkage fused to aromatic radicals with an aromatic diamine. An alternate route to the polymers of this invention employs the reaction of a monomer containing preformed amide linkages and functional groups which, when reacted with the functional groups of a second monomer, produce heterocyclic linkages. The polymerization of the reactants is a condensation reaction which may be conveniently conducted by interfacial or solution polymerization methods, by heating of stoichiometric amounts of reactants and the like.

The following equations are exemplary of how the polymers of the invention can be prepared:

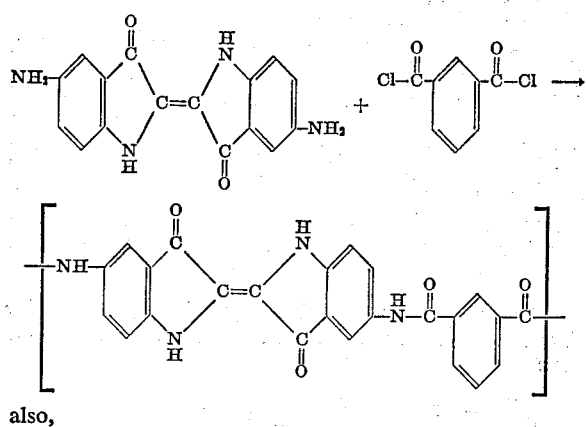

also,

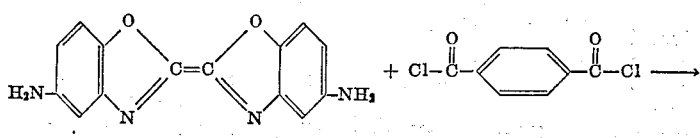

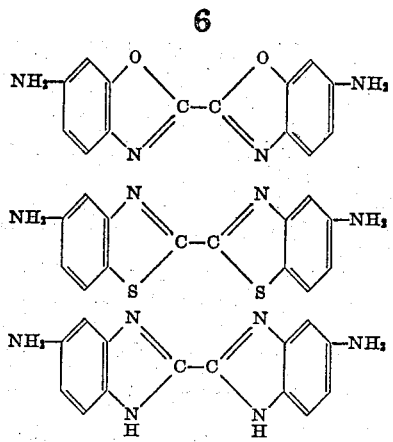

Conveniently, the preparation of the diamines of this invention involve the preparation of a dinitro intermediate which is then reduced to the diamine compound containing heterocyclic linkages. A method of preparation of one of the diamines of this invention is described by A. Baeyer, B. 12, 1317 (1879).

In general, the dinitro intermediates may be prepared by any of several well known methods. In addition to the synthesis described by Baeyer, bis-oxamides containing ortho HO-, $NH_2$-, or -SH groups may be cyclized to dinitro compounds containing fused bis-heterocyclic linkages.

The reduction of the dinitro intermediate to the diamine may be effected by use of catalytic reducing methods such as those involving the use of a palladium on charcoal catalyst typically employing 5 percent palladium on charcoal, a Parr hydrogenation unit or other unit. The reduction may also employ Raney nickel, cobalt and other similar heavy metal catalysts, these catalyst systems usually being effected in an alcohol or in solution in dimethyl formamide or similar compounds. Reduction

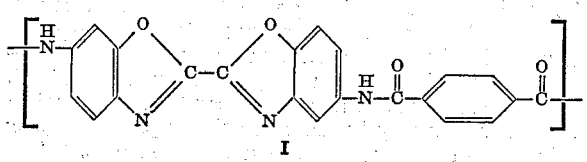

or

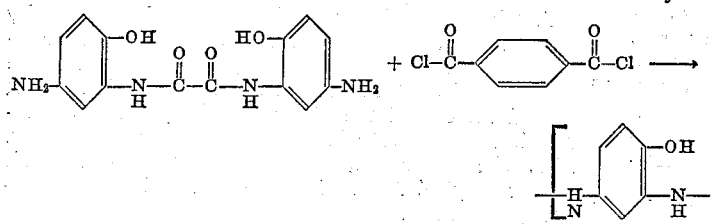

may also be accomplished using chemical reduction methods, such as stannous chloride and hydrochloric acid, iron and sulfuric acid, polysulfide solutions and the like.

Suitable dicarboxylic acids or diacid derivatives which may be used in the practice of the invention include all diacid compounds where the carbonyl radicals are joined by aryl and heterocyclic linkages as defined earlier, for example, aromatic diacid halides such as isophthaloyl halide and substituted isophthaloyl chlorides such as alkyl, aryl, alkoxy, nitro and other similar isophthaloyl chlorides and isophthaloyl bromides. Examples of such compounds include 4,6 - dimethyl-5-propyl isophthaloyl chloride, 2,5-dimethyl isophathaloyl chloride, 2,5-dimethoxy isophthaloyl chloride, 4,6-dimethoxy isophthaloyl chloride, 2,5-diethoxy isophthaloyl chloride, 5-propoxy isophthaloyl chloride, 5-phenyl isophthaloyl chloride, 2-

Of the several routes to the preparation of the polymers of this invention, the polymerization of an aromatic diamine containing the fused bis-heterocyclic linkages may be cited.

As examples of the diamines which may be used in the practice of this invention, the following are typical and illustrative.

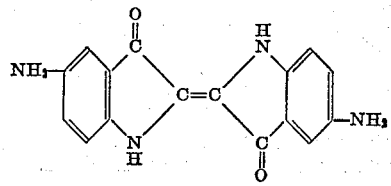

methyl - 5 - phenyl isophthaloyl chloride, 2,5-dinitro isophthaloyl chloride, 5-nitro isophthaloyl chloride or terephthaloyl bromide and the like. Terephthaloyl chloride or terephthaloyl bromide may also be used and may be substituted in the manner described above for isophthaloyl chloride. Examples of terephthaloyl chlorides includes 2,6-dimethyl terephthaloyl chloride, tetramethyl terephthaloyl chloride, 2-methoxy terephthaloyl chloride, 2-nitro terephthaloyl chloride and the like.

These diacid monomers may be prepared by any of the well known prior art methods used to prepare aromatic diacid compounds. For example, oxidation of xylenes.

The polymers of the invention may be obtained by any of the well known condensation polymerization techniques such as solid state, melt, interfacial or solution polymerization techniques.

The solution polymerization method generally involves dissolving the diamine in a suitable solvent which is inert to the polymerization reaction. Among such solvents there may be mentioned dimethylacetamide, 1-methyl-2-pyrrolidone, 2,5 - dimethyl-2-pyrrolidone and the like. These solvents are rendered more effective in many instances by mixing them with a small amount, up to 10 percent, of an alkali or alkaline earth salt such as lithium chloride, lithium bromide, magnesium bromide, magnesium chloride, beryllium chloride, or calcium chloride. The preferred solvent for solution polymerization is dimethylacetamide or dimethylacetamide containing a small amount of dissolved lithium chloride. The diamine solution is cooled to between 20 and −30° C. and the dicarbonyl monomer is added either as a solid or in a solution of one of the aforementioned solvents. The mixture is then stirred for a period of time until polymerization is substantially complete and high viscosity is attained. This highly viscous solution may be spun per se, neutralized with caustic, or the polymer may be isolated by pouring the mixture in a non-solvent washing and drying the polymer and then preparing the spinning solution.

The interfacial polymerization reaction is conducted by mixing water, an emulsifier and the diamine which may be in the form of its dihydrochloride. A proton acceptor is then added and the mixture is then stirred rapidly. During this rapid stirring a solution of the dicarbonyl monomer in an inert organic solvent is added, the mixture is stirred until polymerization is complete, the polymer is then isolated by filtration and is washed and dried. The dicarbonyl monomer solvent may be any convenient solvent such as a cyclic non-aromatic oxygenated organic solvent such as a cyclic tetramethylene sulfone, 2,4-dimethylene sulfone, 2,4-dimethyl cyclic tetramethylene sulfone, tetrahydrofuran, propylene oxide and cyclohexanone. Other suitable dicarbonyl monomer solvents include chlorinated hydrocarbons such as methylene chloride, chloroform and chlorobenzene, benzene, acetone, nitrobenzene, benzonitrile, acetophenone, acetonitrile, toluene and mixtures of the above solvents such as tetrahydrofuran and benzonitrile, tetrahydrofuran and acetophenone or benzene and acetone and the like.

The amounts of the various reactants which may be employed will, of course, vary according to the type of polymer desired. However, in most instances, substantially equimolar quantities or a slight excess of diamine to dicarbonyl monomer may be used. For interfacial polymerization reactions, sufficient proton acceptor to keep the acidic by-products neutralized may be added, the exact amount easily determined by one skilled in the art.

Suitable emulsifying agents for interfacial polymerization include anionic and nonionic compounds such as sodium lauryl sulfate, nonyl phenoxy (ethyleneoxy) ethane, the sodium or potassium salt of any suitable condensed sulfonic acid and the like.

A proton acceptor as the term is employed herein indicates a compound which acts as an acid scavenger to neutralize HCl, formed during the reaction, and which aids to carry the reaction to completion. Suitable proton acceptors include sodium carbonate, magnesium carbonate, calcium carbonate, tertiary amines, such as triethyl amine, trimethyl amine, tripropyl amine, ethyl dimethyl amine, tributyl amine and similar compounds which react as desired.

The products of this invention are useful in a wide range of applications. In the form of fibers, filaments, and films the polymers of this invention are thermally resistant as well as being resistant to acids and other types of chemical degradation.

The invention is further illustrated by the following examples in which all parts and percents are by weight unless otherwise indicated. The polymers were characterized as films of high thermal resistance.

EXAMPLE I

A solution of 0.580 g. of 5,5′-diaminoindigo, prepared essentially according to the method of A. Baeyer, B. 12, 1317(1879), in 10 ml. of dimethylacetamide (DMAc) containing 6 percent dissolved LiCl was cooled to −30° C., then 0.406 g. of isophthaloyl chloride was added. The mixture was stirred under a nitrogen atmosphere for 2 hours at room temperature. Some material remained undissolved. An additional 10 ml. of dimethylacetamide containing 6 percent dissolved LiCl was added and the mixture stirred overnight. A 0.096 g. portion of LiOH was added, and the polymer was coagulated in 100 ml. water, resulting in the isolation of 0.64 g. of a black powder. The polymer did not melt upon heating to 450° C.

EXAMPLE II

This example describes the preparation of the diamine intermediate used in Example III; the reactions involved are:

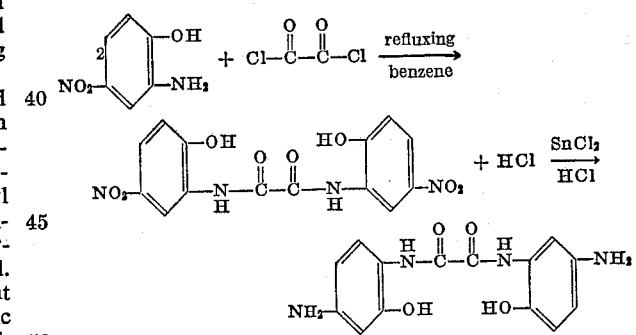

(A) Preparation of dinitro intermediate

A solution of 12.7 g. oxalyl chloride in 65 ml. dry benzene was added with stirring to a slurry of 31 g. 2-amino-4-nitrophenol in 300 ml. dry benzene. The mixture was refluxed for 2 hours then the benzene was distilled; toward the end of the distillation the pressure was reduced. The residue, which weighed 36.1 g. and had a M.P. of 307–310° C., was recrystallized from 250 ml. DMAc to yield 35 g. of N,N′-bis (3-amino-6-hydroxyphenyl) oxamide.

Analysis.—Calculated: N, 15.48. Found: N, 15.46, 15.22.

(B) Reduction to diamine

A 6 g. sample of the material above was stirred for 2 hours at reflux with a solution of 23 g. stannous chloride monohydrate, 25 ml. concentrated hydrochloric acid, and 25 ml. ethanol. The cooled reaction mixture next was filtered, the residue washed with ethanol, and dried to yield 4 g. of crude diamine dihydrochloride.

The diamine dihydrochloride was dropped into 200 ml. boiling water containing 30 ml. 1 N hydrochloric acid; the resulting solution was filtered and the filtrate neutralized with ammonium hydroxide. The diamine precipitate was collected, washed with water and dried.

EXAMPLE III

The polymers of this example have the following structures:

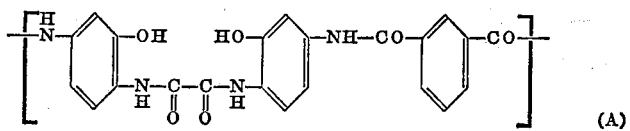
(A)

and

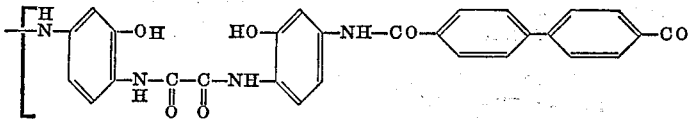
(B)

Heating of A and B at high temperatures or treatment of A or B with powerful dehydrating agents converts A and B to C and D respectively.

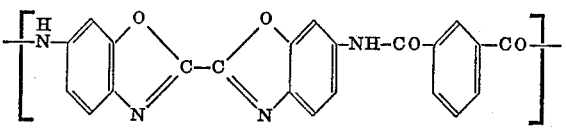
(C)

and

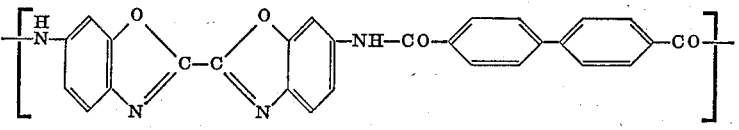
(D)

(A) A solution of 0.3 g. of the diamine of Example II(B) in 2 ml. DMAc containing 3% dissolved lithium chloride was cooled to −30° C. and 0.20 g. isophthalyl chloride was added. The solution was allowed to warm to room temperature and was neutralized with 0.05 g. lithium hydroxide.

A film was cast from the above dope; heating of the film converted it to polymer C.

(B) A solution of 0.15 g. of the diamine of Example II(B) in 1 ml. DMAc containing 7% dissolved lithium chloride was cooled to −30° C. and 0.14 g. 4,4′-bibenzoyl chloride was added. The solution was allowed to warm to room temperature. The unneutralized dope was spread on a glass plate and baked out at 140° C. A clear film was removed from the plate by submerging the plate in water. An infrared (IR) spectrum of the film shows the presence of —NH— and —OH groups. Heating of the film at high temperature or treatment with strong dehydrating agents causes the disappearance of —OH from the IR spectrum thus showing the formation of polymer D.

The foregoing detailed description has been given for clearness of understanding only, and unnecessary limitations are not to be construed therefrom. The invention is not to be limited to the exact details shown and described since obvious modifications will occur to those skilled in the art, and any departure from the description herein that conforms to the present invention is intended to be included within the scope of the claims.

We claim:

1. An amide-heterocyclic polymer composed of regularly recurring structural units of the formula

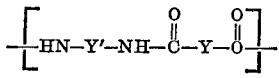

wherein Y and Y′ are selected from the group consisting of Ar and Ar′—X—X—Ar′ where Ar is a hydrocarbon aromatic divalent radical, Ar′ is a hydrocarbon aromatic trivalent radical, X is a heterocyclic radical of 5 to 6 ring members containing from 1 to 2 hetero atoms selected from As, N, O, P, S and Se, X is fused to adjacent carbon atoms of Ar′, all occurrences of X in the recurring unit must be the same, and wherein at least one Ar′—X—X—Ar′ radical must be present in each recurring structural unit, and wherein a point of symmetry is present in each repeating unit.

2. An amide-heterocyclic polymer composed of regularly recurring structural units of the formula

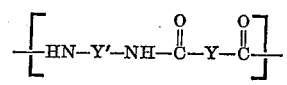

wherein Y and Y′ are selected from the group consisting of Ar and Ar′—X—X—Ar′ where Ar is a hydrocarbon aromatic divalent radical containing up to 15 carbon atoms, Ar′ is a hydrocarbon aromatic trivalent radical, X is a heterocyclic radical of 5 to 6 ring members containing from 1 to 2 hetero atoms selected from As, N, O, P, S and Se, X is fused to adjacent carbon atoms of Ar′, all occurrences of X in the recurring unit must be the same, and wherein at least one Ar′—X—X—Ar′ radical must be present in each recurring structural unit, and wherein a point of symmetry is present in each repeating unit.

3. A fiber-forming amide-heterocyclic polymer composed of regularly recurring structural units of the formula

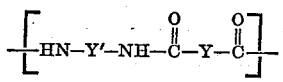

wherein Y and Y′ are selected from the group consisting of Ar and Ar′—X—X—Ar′ where Ar is a hydrocarbon aromatic divalent radical containing up to 15 carbon atoms, Ar′ is a hydrocarbon aromatic trivalent radical, X is a heterocyclic radical of 5 to 6 ring members containing from 1 to 2 hetero atoms selected from As, N, O, P, S and Se, X is fused to adjacent carbon atoms of Ar′ all occurrences of X in the recurring unit must be the same, and wherein at least one Ar′—X—X—Ar′ radical must be present in each recurring structural unit, and wherein a point of symmetry is present in each repeating unit.

4. An amide-heterocyclic polymer composed of regularly recurring structural units of the formula

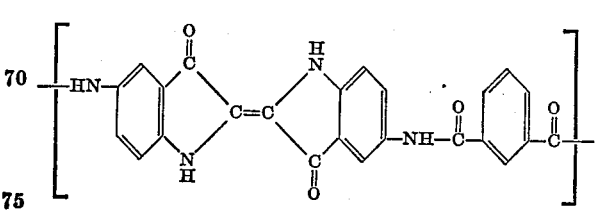

5. An amide-heterocyclic polymer composed of regularly recurring structural units of the formula

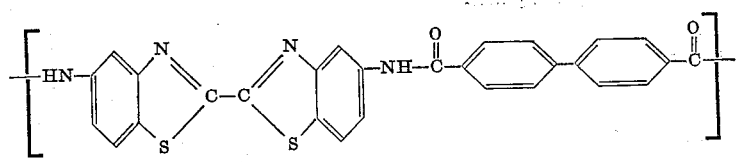

6. An amide-heterocyclic polymer composed of regularly recurring structural units of the formula

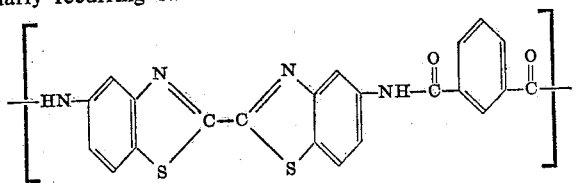

7. An amide-heterocyclic polymer composed of regularly recurring structural units of the formula

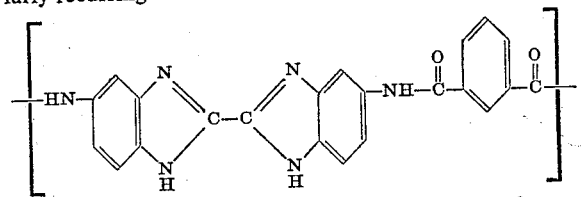

8. An amide-heterocyclic polymer composed of regularly recurring structural units of the formula

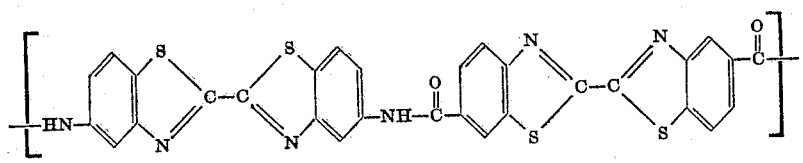

9. An amide-heterocyclic polymer composed of regularly recurring structural units of the formula

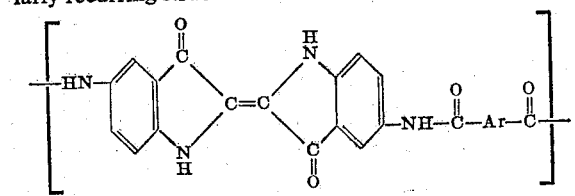

wherein Ar is a hydrocarbon aromatic divalent radical containing up to 15 carbon atoms.

10. An amide-heterocyclic polymer composed of regularly recurring structural units of the formula

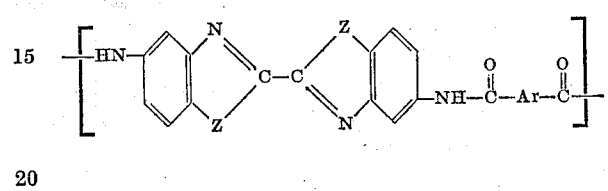

wherein Z is oxygen, sulfur or N—R where R is H, lower alkyl, benzyl or phenyl, and Ar is an aromatic divalent radical containing up to 15 carbon atoms.

11. The polymer of claim 1 in the form of a fiber.

12. The polymer of claim 1 in the form of a self-supporting film.

References Cited
UNITED STATES PATENTS

| | | | |
|---|---|---|---|
| 2,920,077 | 1/1960 | Bindler et al. | 260—78 |
| 2,986,563 | 5/1961 | Boekelheide et al. | 260—78 |
| 3,049,518 | 8/1962 | Stephens | 260—78 |
| 3,179,635 | 4/1965 | Frost et al. | 260—47 |
| 3,205,202 | 9/1965 | Schnegg et al. | 260—78 |
| 3,213,058 | 10/1965 | Boyle et al. | 260—78 |

WILLIAM H. SHORT, *Primary Examiner.*

H. D. ANDERSON, *Assistant Examiner.*